(12) United States Patent
Fikouras et al.

(10) Patent No.: US 9,756,090 B2
(45) Date of Patent: Sep. 5, 2017

(54) TECHNIQUE FOR PROVIDING SERVICES IN A SERVICE PROVISIONING NETWORK

(75) Inventors: Ioannis Fikouras, Aachen (DE); Roman Levenshteyn, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2240 days.

(21) Appl. No.: 12/520,048

(22) PCT Filed: Dec. 19, 2006

(86) PCT No.: PCT/EP2006/012266
§ 371 (c)(1),
(2), (4) Date: Jun. 18, 2009

(87) PCT Pub. No.: WO2008/074348
PCT Pub. Date: Jun. 26, 2008

(65) Prior Publication Data
US 2010/0030905 A1    Feb. 4, 2010

(51) Int. Cl.
*G06F 15/16*     (2006.01)
*H04L 29/06*     (2006.01)
*H04M 3/42*      (2006.01)

(52) U.S. Cl.
CPC .... *H04L 65/1096* (2013.01); *H04M 3/42144* (2013.01); *H04L 65/1016* (2013.01)

(58) Field of Classification Search
CPC .......................... H04L 65/1096; H04L 65/1016
See application file for complete search history.

(56) References Cited

U.S. PATENT DOCUMENTS

| | | | |
|---|---|---|---|
| 2002/0188720 A1* | 12/2002 | Terrell et al. | 709/225 |
| 2005/0108347 A1 | 5/2005 | Lybeck et al. | |
| 2006/0291488 A1 | 12/2006 | Naqvi et al. | |
| 2007/0067470 A1* | 3/2007 | Ayers et al. | 709/230 |
| 2007/0121622 A1* | 5/2007 | Zhu et al. | 370/389 |
| 2008/0137646 A1* | 6/2008 | Agarwal et al. | 370/352 |
| 2010/0061316 A1 | 3/2010 | Levenshteyn et al. | |

FOREIGN PATENT DOCUMENTS

| | | |
|---|---|---|
| CN | 1859333 A | 11/2006 |
| EP | 1 635 583 A | 3/2006 |
| EP | 1 675 347 A1 | 6/2006 |
| EP | 1 753 199 A | 2/2007 |
| WO | WO 03/071761 A | 8/2003 |
| WO | WO 03/091891 A | 11/2003 |
| WO | WO 2007/009498 A | 1/2007 |

OTHER PUBLICATIONS

3GPP; Technical Specification Group Core Network; IP Multimedia (IM) Subsystem Cx and Dx interfaces; Signalling flows and message contents (Release 5) 3GPP TS 29.228 V5.10.0 (Dec. 2004).
ETSI Standards: "Digital cellular telecommunications system (Phase 2+)," vol. 3-CN1, No. V731, Oct. 2006.

* cited by examiner

*Primary Examiner* — Karen Tang

(57) ABSTRACT

The invention relates to techniques for providing services in a service provisioning network (100'), wherein a service-related message (118) is routed by a service routing node (104') to a service hosting node (106'). A method embodiment of the invention comprises in the service routing node the steps of receiving, e.g. from the service hosting node, service availability information (124) indicating an availability of the service in the service hosting node; and establishing, based on the received service availability information, a service routing rule.

34 Claims, 13 Drawing Sheets

900

| | |
|---|---|
| 1 | REGISTER sip:example.com SIP/2.0 |
| 2 | From: sip:service.provider@example.com;tag=asd98 |
| 3 | To: sip: service.provider@example.com |
| 4 | Call-ID: hh89as0d-asd88jkk@host.example.com |
| 5 | CSeq: 9987 REGISTER |
| 6 | Max-Forwards: 70 |
| 7 | Via: SIP/2.0/UDP host.example.com;branch=z9hG4bKnashds |
| 8 | Contact: <sip:user@host.example.com>;audio=LSI1;video=LSI2 |
| 9 | ;video=LSI3;actor="msg-taker" |
| 10 | ;automata;mobility="fixed" |
| 11 | ;methods="INVITE"; ifcid="jk3df5hj2k5sdh1fsd" |
| 12 | Content-Length: 0 |

```
<InitialFilterCriteria>
    <Priority>0</Priority>
    <TriggerPoint>
        <ConditionTypeCNF>0</ConditionTypeCNF>
        <SPT>
            <ConditionNegated>0</ConditionNegated>     ← 1004
            <Group>0</Group>
            <Method>INVITE</Method>
        </SPT>
        <SPT>
            <ConditionNegated>0</ConditionNegated>     ← 1006
            <Group>0</Group>
            <SessionCase>ORIGINATING_SESSION</SessionCase>
        </SPT>
        <SPT>
            <ConditionNegated>0</ConditionNegated>
            <Group>0</Group>
            <SIPHeader>                                 ← 1008
                <Header>To</Header>
                    <Content>sip:service.provider@example.com</Content>
            </SIPHeader>
        </SPT>
        <SPT>
            <ConditionNegated>0</ConditionNegated>
            <Group>0</Group>
            <SIPHeader>                                 ← 1010
                <Header>Accept-Contact</Header>
                <Content>audio; video=LSI1</Content>
            </SIPHeader>
        </SPT>
    </TriggerPoint>
    <ApplicationServer>
        <ServerName>sip:user@host.example.com</ServerName>   ← 1002
        <DefaultHandling>0</DefaultHandling>
    </ApplicationServer>
</InitialFilterCriteria>
```

INVITE sip:service.provider@example.com SIP/2.0
Via: SIP/2.0/UDP [5555::aaa:bbb:ccc:ddd];branch=z9hG4bKnashds7
Max-Forwards: 70
Route: <sip:pcscf1.visited1.net;lr>, <sip:scscf1.home1.net;lr>
From: <sip:invocer@example.com>;tag=171828
To: <sip:service.provider@example.com>
Call-ID: cb03a0s09a2sdfglkj490333
Cseq: 127 INVITE
Contact: <sip:[5555::aaa:bbb:ccc:ddd]>
Accept-Contact: audio; video=LSI1
Content-Type: application/sdp
Content-Length: 248

| | |
|---|---|
| 1 | REGISTER sip:example.com SIP/2.0 |
| 2 | From: sip: service.provider@example.com;tag=asd98 |
| 3 | To: sip: service.provider@example.com |
| 4 | Call-ID: hh89as0d-asd88jkk@host.example.com |
| 5 | CSeq: 9987 REGISTER |
| 6 | Max-Forwards: 70 |
| 7 | Via: SIP/2.0/UDP host.example.com;branch=z9hG4bKnashds |
| 8 | Contact: <sip:user@host.example.com>;audio=LSI1;video=LSI2 |
| 9 | ;video=LSI3;actor="msg-taker" |
| 10 | ;automata;mobility="fixed"; |
| 11 | ;methods="INVITE"; ifcid="jk3df5hj2k5sdh1fsd" |
| 12 | Expires: 0 |
| 13 | Content-Length: 0 |

```
1   REGISTER sip:example.com SIP/2.0
2   From: sip: service.provider@example.com;tag=asd98
3   To: sip: service.provider@example.com
4   Call-ID: hh89as0d-asd88jkk@host.example.com
5   CSeq: 9987 REGISTER
6   Max-Forwards: 70
7   Via: SIP/2.0/UDP host.example.com;branch=z9hG4bKnashds
8   Contact:
    <sip:user@host.example.com>;audio=LSI1;video=LSI2
9     ;video=LSI3;actor="msg-taker"
10    ;automata;mobility="fixed";
11    ;methods="INVITE"; ifcid="jk3df5hj2k5sdh1fsd"
12  Expires: 3600
13  Content-Length: 0
```

```
<InitialFilterCriteria>
  <Priority>0</Priority>
  <TriggerPoint>
    <ConditionTypeCNF>0</ConditionTypeCNF>
    <SPT>
      <ConditionNegated>0</ConditionNegated>
      <Group>0</Group>
      <Method>INVITE</Method>
    </SPT>
    <SPT>
      <ConditionNegated>0</ConditionNegated>
      <Group>0</Group>
      <SessionCase>ORIGINATING_SESSION</SessionCase>
    </SPT>
    <SPT>
      <ConditionNegated>0</ConditionNegated>
      <Group>0</Group>
```

1402 {
```
      <function>                                      Function
        <name>contains</name>                         Oper. type
        <arg>
          <SIPHeader>
            <Header>Accept-Contact</Header>           Argument 1
          </SIPHeader>
        </arg>
        <arg>
          <Content>audio</Content>                    Argument 2
        </arg>
      </function>
```

```
    </SPT>
  </TriggerPoint>
  <ApplicationServer>
    <ServerName>
```

1404 {
```
      <variable>                                      Variable
        <table>Attached_Services_Gateways</table>     Value Table
        <column>Gateway_URI</column>                  Column
        <key>                                         Row Key
          <SIPHeader>
            <Header>To</Header>
          </SIPHeader>
        </key>
      </variable>
```

```
    </ServerName>
    <DefaultHandling>0</DefaultHandling>
  </ApplicationServer>
```

Fig. 14

TECHNIQUE FOR PROVIDING SERVICES IN A SERVICE PROVISIONING NETWORK

FIELD OF THE INVENTION

The present invention generally relates to the field of service provisioning in communication networks, for example IMS networks. More specifically, the invention relates to techniques for providing services in a service provisioning network, wherein a service-related message is routed by a service routing node to a service hosting node.

BACKGROUND OF THE INVENTION

The IP Multimedia Subsystem (IMS) is a Next Generation Networking (NGN) architecture for telecommunications services standardised by the $3^{rd}$ Generation Partnership Project (3GPP) and fixed services standardised by the ETSI Telecoms & Internet converged Services & Protocols for Advanced Networks (TISPAN) group. IMS was defined using Internet protocols standardised by the Internet Engineering Task Force (IETF). Specifically, IMS builds on the IETF Session Initiation Protocol (SIP) with a few extensions standardised by 3GPP and running over the Internet Protocol (IP). Both packet-switched and circuit-switched telecommunications systems are supported and any combination of IMS and Internet users can setup a session between them.

IMS was designed not only to provide new services, but also to act as an integration platform for both current and future services, both telecommunications and Internet services. IMS aims to provide access to services to both stationary and mobile users, regardless of the type of network they currently roam. Consequently, IMS merges the Internet with the mobility paradigm for application developers by enabling the use of cellular technologies to provide ubiquitous access and Internet technologies to provide appealing services.

The IMS hosts a plurality of basic communication functions for providing services to subscribers, for example for authentication, charging, storage of user profiles, etc. Value-added services (VAS) may also be provided via IMS. VAS are services which rely on basic services such as the above-mentioned standard call services, but which offer additional benefits to the user and may thus also offer possibilities for the service provider to generate revenues. General examples of VAS in the telecommunication area are facsimile services and telephone information services; in the mobile area, SMS and MMS are prominent examples for VAS. Value-added services may be provided by the mobile operator himself, but may also be provided by a third-party VAS provider.

A central node in IMS networks is the S-CSCF (Serving Call State Control Function), which performs session-related functions such as registration, authentication and session control for a user (or, more precisely, for a user identity in the network). The S-CSCF also implements session routing functions for calling and/or called IMS users. A HSS (Home Subscriber Server) node hosts a service profile database for storing user profiles. Generally, in IMS networks the call/session processing logic and the service control logic are separated. Therefore the service control for particular services such as VAS is located in application servers internal or external to the IMS. A service request from a user is forwarded by the S-CSCF, which thus acts as a service routing node, to the corresponding application server.

The SIP (Session Initiation Protocol) may be used for controlling sessions in an IMS network. SIP is used for establishment, control and tearing down of sessions. Invocation of services via SIP may be achieved by using either a public SIP URI (Uniform Resource Identifier) or a private URL (Uniform Resource Locator). An URI only names a resource, e.g. an application server, whereas an URL, which is typically device specific, specifies a resource location in the network and thus allows accessing the resource. Routing of service invocation calls may be handled by a SIP registry, i.e. a CSCF node that is aware of the current locations of every registered user, application server, etc. (i.e. any registered user identity; a server may also be regarded as a user in this respect) and redirects service invocation calls specifying an URI to a currently correct URL.

A user identity is represented in an IMS network by a user agent, which may be located in a user device associated to the user identity or elsewhere in the network. The user agent acts on behalf of the user device, for example registers the device in the network. Invoking a service in an IMS network may comprise reception of a service request originating from a user agent at the S-CSCF. An URI of a service resource may be specified in the service request. The S-CSCF then forwards the service request to the application server hosting the requested service. For this purpose, the S-CSCF has a number of "initial Filter Criteria" implemented, which allow a decision to which application server to forward the received SIP message representing the service request.

The iFC may be generally regarded as service routing rules. These rules basically comprise a filter part and a decision part, wherein the filter part comprises the so-called Service Point Triggers (SPTs) defining one or more filter criteria which are applied to incoming service request messages. The decision part specifies the action(s) to be taken when the incoming message matches with the filter criteria of the rule. The SPTs indicate the points in the session control signalling on which filter criteria can be set. For example, a filter criterion can be set on an initial incoming SIP message such as a REGISTER or INVITE message and/or on the presence or content of one or more header fields in the message. A set filter criterion may then comprise, for example, a specific address (e.g., URI) of an application server. Filter criteria are specific for a user identity and a given application server.

Filter criteria thus basically trigger sending a service-related message such as a service request to a specific application server. Filter criteria used by the S-CSCF for triggering application servers during processing of service requests are specified by the 3GPP ($3^{rd}$ Generation Partnership Project) UMTS standardisation body for example in the TS (Technical Specification) 23.218, TS 23.228 and TS 29.228.

There are two kinds of filter criteria, the initial filter criteria (iFC) and subsequent filter criteria. Initial filter criteria are stored in the HSS as part of the user-related service profile. If the user is subscribed to multiple services, multiple iFCs will be part of its subscriber profile stored in the HSS. Each iFC thus represents a provisioned subscription of a user to an application. The iFCs are received by the S-CSCF from the HSS during registration (e.g., initial registration or renewed registration) of a user identity in the IMS domain. Subsequent filter criteria may be signalled from an application server to the S-CSCF once the server has been involved in service control by the S-CSCF, which performed a routing decision based on the corresponding iFC. The subsequent filter criteria allow the dynamic (re-) definition of the relevant SPTs at application execution time.

For the definition of a new service, corresponding new iFCs have to be generated and provided to the user service profiles in the HSS. Typically, iFCs are created by administrative action. For example, new iFCs may be entered and created at an OAM(Operation, Administration and Maintenance)-terminal by an administrator for a possibly large number of users. After creation, the iFCs are transferred into the HSS and stored in association with the corresponding service profiles. Therefore, after a new service is available on an application server and after provision of the corresponding iFCs in the HSS, for each user a new registration is required to trigger downloading of the new iFC to the S-CSCF. Only after the iFCs are ready to be applied to incoming service-related messages the new service can be provided to the users. These service provisioning procedures are thus expensive and cumbersome in that they require considerable administrative action and a (re-)registration of the users.

The automatic creation of new services plays already today an important role for application service providers and will presumably play an even more important role in the future. However, after a service has been made available to users in the application server in an automated way, still the iFCs have to be generated and downloaded to the service routing nodes. These requirements may even prevent an automatic provisioning of the new service, at least they lead to a considerable overhead for the provisioning. Thus, the new service can be provisioned only with a delay which depends, amongst others, on the employed OAM-resources There is a need for a technique for providing services in a service provisioning network which enables the provisioning of a new service in a fast and efficient way.

SUMMARY OF THE INVENTION

According to a first aspect of the invention, a method for providing a service in a service provisioning network is proposed, wherein a service-related message is routed by a service routing node according to one or more service routing rules to a service hosting node hosting the service. The method is performed in the service routing node and comprises the steps of receiving service availability information indicating an availability of a service in a service hosting node; and establishing, based on the service availability information, a service routing rule.

The service provisioning network may be an IMS network, for example. The service-related message may be any message, which may originate from a user agent in the network representing, for example, a user identity associated with a user or user device, and which intends that an action is performed in the service routing node which is related to a service hosted by the service hosting node. For example, within the SIP framework, a REGISTER, INVITE, SUBSCRIBE, or MESSAGE message may be a service-related message. In an IMS environment, the service routing node may be implemented in a CSCF, more particularly in an S-CSCF. An application server internal or external to the IMS may be an implementation of the service hosting node.

The service availability information may be received from the service hosting node itself or from another node, e.g an administration point or a central server of a server farm to which the service hosting node belongs. The service availability information may, e.g., indicate a new service available in the service hosting node or may indicate the activation of a service at the service hosting node.

According to a variant of the invention, the method further comprises the step of transmitting the established service routing rule to a service routing rule database, which may, for example, be located in the service provisioning network. The service routing rule database may be provided for storing service routing rules for multiple service routing nodes in the network. In one mode of this variant, the service routing rule database is a part of a service profile database, i.e. the service routing rule is transmitted to a service profile database, e.g. in the service provisioning network, for storing service profiles related to user identities. An HSS associated with an IMS domain may be an implementation of a service profile database. However, the service routing rule database or service profile database may also be located external to the service provisioning network. A user identity may be related to a single human user or to a group of humans. Further, a user identity may also be related to a machine user. For example, a server may have a user service profile assigned for man-machine or machine-machine communication.

The step of establishing the service routing rule may comprise at least one of creating a new service routing rule and activating an existing service routing rule. iFC as used in IMS networks may be an implementation of service routing rules.

The step of receiving the service availability information may comprise receiving a registration request for registering the service. For example, the service availability information may be included in a registering request for registering the service indicated in the service availability information in the service routing node. The service routing node may act as a registry for registering user identities as well as other network identities in the service provisioning network. The service availability information may explicitly or implicitly be included in the registration request. For example, the service routing node may treat the request itself as the service availability information. The registration request may relate to a new service or to an existing service. For example, a new service may have been implemented on the service hosting node, or the service hosting node for the first time requests registration of this service at the particular service routing node.

In some implementations of the invention, the service routing rule is generated based on data extracted from the service availability information. For example, a routing address (e.g., an URL) may be used by the service routing node for routing a service-related message to the service hosting node may be extracted from the service availability information. As another example, a filtering address (e.g., an URI) used by the service routing node for filtering service-related messages may be extracted from the service availability information. As still further examples, a type of a service-related message, a status of a requesting user identity, or a type of a requested service may be extracted from the service activation information.

In variants of these implementations, service reference information for referencing the service in a service-related message is extracted from the service availability information. For example, in an IMS network, the application server may provide within a SIP REGISTER message an iFC-ID to the CSCF. The service reference information may be used in service-related messages received by and/or forwarded from the service routing node. The step of establishing the service routing rule may be performed in response to a detection of the service reference information in the service availability information. Further to the aforementioned example, the detection of an iFC-ID may trigger the creation of a new iFC in the CSCF.

In alternative variants, the step of establishing the service routing rule may comprise generating service reference information for referencing the service in a service-related message. For example, an iFC-ID may be generated in the CSCF according to an appropriate prescription, which may, e.g., comprise an assignment of a consecutive number, which is uniquely assigned to a service in the CSCF, to a CSCF-specific number, such that an iFC-ID is generated which is unique in the network.

A plurality of service routing rules may be established based on the received service availability information. For example, user-specific rules may be generated for a number of user identities in the network. The service routing rule may be related to one or more services provided for one or more user identities. For example, the service routing rule may be applicable to a group of users.

In one representation of the invention, the method further comprises the steps of receiving service unavailability information indicating an unavailability of the service; and de-establishing, based on the service unavailability information, the service routing rule. The de-establishing may comprise a removal or a deactivation. Whereas a removal of the rule may remove any representation of the rule in storage components associated with the service routing rule and/or a service routing rule database, after deactivation a rule may remain in storage for later re-activation. This representation may further comprise the step of transmitting, in response to the service unavailability information, a removal or deactivation command to a service routing rule database, which may, e.g., be an external database located elsewhere in the service provisioning network.

In some variants of this representation of the invention, the service availability information comprises at least one indication of a point in time, and the service routing rule is established or de-established according to the time indication. For example, an absolute or relative indication of a point in time in the service availability information may be taken in the service routing node as a trigger to establish or de-establish a corresponding rule at this time point. In one mode of the invention, the service availability information may comprise the service unavailability information. For example, the service availability information may indicate a time period, e.g., 3600 seconds, which might lead to an instant creation and/or activation of a service routing rule and to its deactivation or removal 1 hour after its activation.

Service routing rules related to a user identity may generally be provided from the service routing rule database to the service routing node upon a registration of the user identity. For example, in an IMS network, the HSS provides iFCs to the S-CSCF. However, a service routing rule established in a service routing node may be utilized, independently from a registration of the user identity, by the service routing node for routing service requests, e.g. the S-CSCF may immediately utilize newly established iFC for routing service-related messages.

In some implementations of the invention, the service routing rule comprises at least one of instructions for an analysis of a body of the service-related message and instructions for accessing external data during employment of the rule. For example, instead of only analyzing the existence and possibly the content of header fields, e.g., also the payload of SDP messages may be analysed. During employment of the rule, for example databases may be searched to replace variables in the rule with concrete values.

According to a second aspect of the invention, a further method for providing a service in a service provisioning network is proposed, wherein a service-related message is routed by a service routing node to a service hosting node hosting the service according to one or more service routing rules. The method is performed in the service hosting node and comprises the steps of preparing an availability of a service; and initiating a transmission of service availability information indicating the availability of the service to the service routing node.

The step of preparing the availability of the service may comprise implementing and activating the service on the service hosting node, e.g. an application server internal or external to the service provisioning network. The step may also comprise activating an already implemented service for access by one or more user identities via the network.

The method may comprise the further step of creating service availability information. The step of creating the service availability information may comprise generating a registration request for registering the service. The registration request itself may represent the service availability information and/or specific, additional information may be included in the registration request. For example, the service availability information may comprise service reference information for referencing the service. For instance, an application server in IMS may include an iFC ID in a SIP REGISTER message directed towards an S-CSCF.

In some implementations of the second aspect of the invention, the method comprises the steps of creating and transmitting service unavailability information indicating an unavailability of the service. For example, a service hosted by the service hosting node may be deactivated for a short time, periodically or permanently. According to one variant of these implementations, the service availability information comprises the service unavailability information.

According to a third aspect of the invention, a method for providing a service in a service provisioning network is proposed, wherein a service-related message is routed by a service routing node to a service hosting node hosting the service according to one or more service routing rules provided to the service routing node by a service routing rule database. The method is performed in the service routing rule database and comprises the steps of receiving and storing a service routing rule received from and established by the service routing node.

The service routing rule database may be included in a service profile database, e.g. in the service provisioning network, for storing service profiles related to user identities. For example, in an IMS network, the HSS may be adapted to store iFC provided to it via OAM. iFC may be stored in association to one or more service profiles representing service subscriptions of user identities in the network. The HSS may additionally be adapted to receive and store iFC provided to it from one or more CSCF nodes.

The service routing rule may comprise service reference information for referencing a service. In one mode of the third aspect of the invention, the method comprises the steps of receiving a deactivation command related to the service routing rule from the service routing node; and deactivating, responsive to the deactivation command, the service routing rule.

According to a fourth aspect of the invention, a computer program product comprising program code portions for performing the steps of any one of the method aspects described herein when the computer program product is executed on one or more computing devices, for example a service routing node (e.g., a CSCF platform), a service hosting node (e.g., an application server) or a service routing rule database (e.g., an HSS). The computer program product may be stored on a computer readable recording medium, such as a permanent or re-writeable memory within or associated with a computing device or a removable CD-ROM or DVD. Additionally or alternatively, the computer program product may be provided for download to a computing device, for example via a network such as the Internet and/or a communication line such as a telephone line.

According to a fifth aspect of the invention, a service routing node for providing a service in a service provisioning network is proposed, wherein the service routing node is adapted to route a service-related message to a service hosting node hosting the service according to one or more service routing rules. The service routing node comprises a reception component adapted to receive, e.g. from the service hosting node, service availability information indicating an availability of a service in a service hosting node; and a rule establishing component adapted to establish, based on the service availability information, a service routing rule.

The service routing node may further comprise a transmission component adapted to transmit the service routing rule to a service routing rule database, which may be located inside or outside the service provisioning network. Additionally or alternatively, the service routing node may further comprise an extraction component adapted to extract data from the service availability information for generating the service routing rule.

According to a sixth aspect of the invention, a service hosting node for providing a service in a service provisioning network is proposed, wherein a service-related message is routed by a service routing node to the service hosting node hosting the service according to one or more service routing rules. The service hosting node comprises a service preparation component adapted to prepare an availability of the service; and a transmission component adapted to initiate transmission of the service availability information to the service routing node.

According to a seventh aspect of the invention, a service routing rule database for providing a service in a service provisioning network is proposed, wherein a service-related message is routed by a service routing node to a service hosting node hosting the service according to one or more service routing rules and the service routing rule database is adapted to provide the one or more service routing rules to the service routing node. The service routing rule database comprises a reception component adapted to receive a service routing rule from the service routing node established by the service routing node; and a storage component adapted to store the received service routing rule. The service routing rule database may be included in a service profile database inside or outside the service provisioning network for storing service profiles related to user identities.

BRIEF DESCRIPTION OF THE DRAWINGS

In the following, the invention will further be described with reference to exemplary embodiments illustrated in the figures, in which:

FIG. 9 illustrates the content of a first embodiment of a message transporting service availability information;

FIG. 10 illustrates a first embodiment of an automatically created iFC;

FIG. 11 illustrates the content of an embodiment of a service-related message received at a service routing node;

FIG. 12 illustrates the content of a second embodiment of a message transporting service availability information;

FIG. 13 illustrates the content of a third embodiment of a message transporting service availability information;

FIG. 14 illustrates a second embodiment of an automatically created iFC.

DETAILED DESCRIPTION OF PREFERRED EMBODIMENTS

In the following description, for purposes of explanation and not limitation, specific details are set forth, such as specific network topologies including particular network nodes, communication protocols etc., in order to provide a thorough understanding of the current invention. It will be apparent to one skilled in the art that the current invention may be practised in other embodiments that depart from these specific details. For example, the skilled artisan will appreciate that the current invention may be practised with service provisioning networks different from the IMS network discussed below to illustrate the present invention. Rather, the invention may be practised with any network adapted to provide services to user identities and wherein, for example, call/session control and service control are separated. This may include for example the Intelligent Network part of GSM networks.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

Figure 1A:
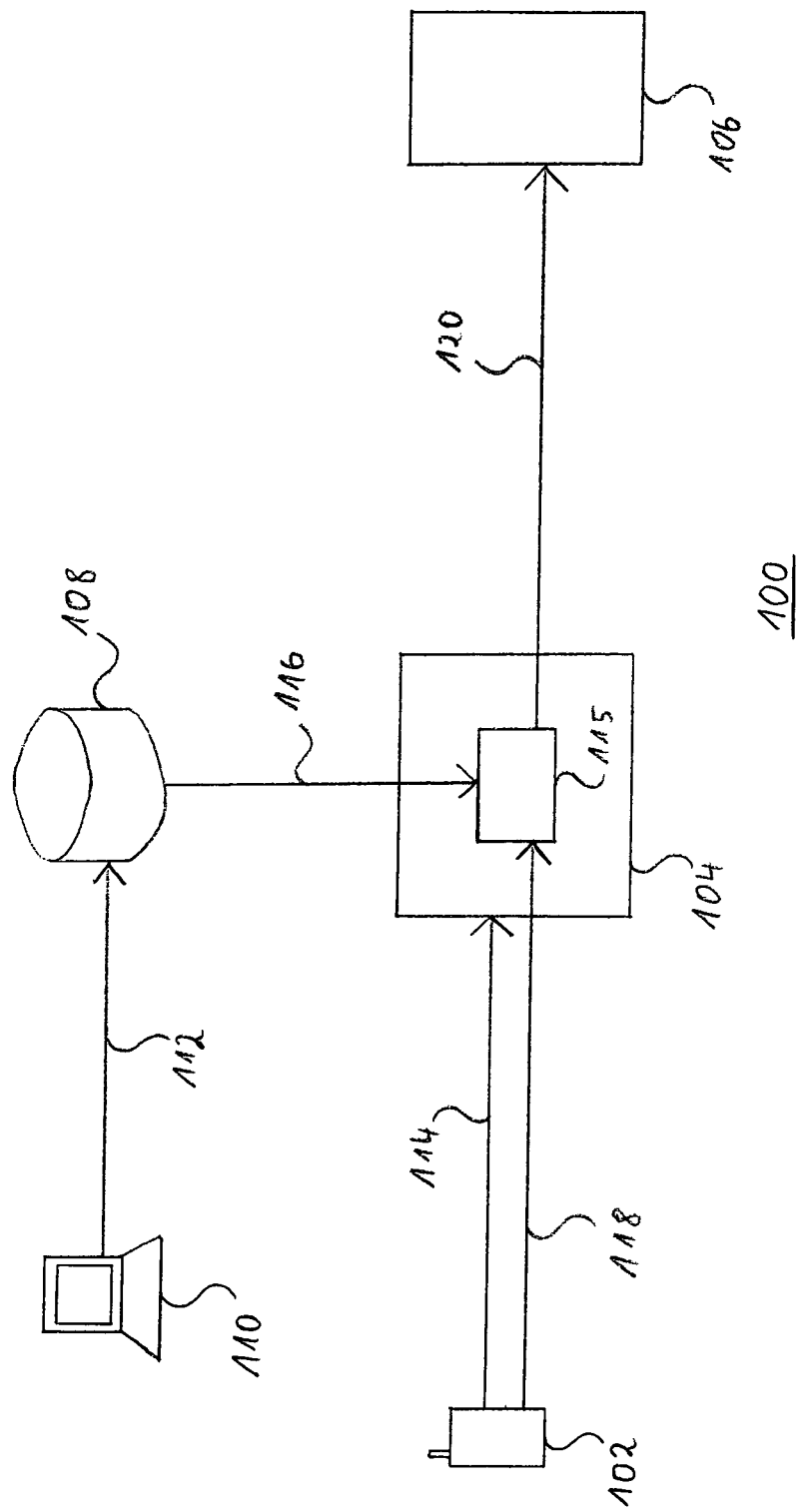
FIGS. 1A, 1B are schematic illustrations of an embodiment of a service provisioning network.

With reference to FIG. 1A, a first embodiment of a service provisioning network 100 will be described. A user device 102, a service routing node 104 and a service hosting node 106 are associated with the network 100. The service provisioning network 100 is (in this embodiment) an IMS network, wherein SIP is deployed as signalling protocol. The service routing node 104 is an S-CSCF. The service hosting node 106 is an application server. The user device 102 may be represented in the network 100 by a user identity registered in the S-CSCF 104. A user agent located within the user device 102 or elsewhere in the network 100 acts on behalf of the device 102, for example registers the device in the network. The user agent thus represents a user identity related to the user device 102 in the network 100. A 'user' may be a human or a machine user such as a server.

The application server 106 may be located internal or external to the network 100, i.e. the server may be operated by the operator of the network 100 or may be operated by an application service provider.

The network 100 further comprises a service routing rule database, which is a part of an HSS 108. A service profile associated with the user identity of user device 102 is stored in the HSS 108. The service profile comprises in particular a set of initial Filter Criteria (iFCs), which may be created, updated or otherwise administered via the OAM terminal 110 by administrative access 112 to the HSS 108. Upon a registration 114 of the user 102 at a SIP registry (not shown), which is assumed to be associated with the S-CSCF 104, the HSS 108 is contacted. From the service profile associated with user 102, one or more iFCs are downloaded from the HSS 108 to a routing component 115 the CSCF 104, as indicated by arrow 116. The downloaded iFCs may be temporarily stored in the S-CSCF, for example, as long as the user agent 102 is registered.

The iFCs are used in the routing component 115 for filtering any incoming message. In case a service-related message originating from the user agent related to device 102 matches the filter criteria of an iFC, a routing decision as specified in the iFC is performed. For example, in case a user of the user device 102 wants to access a service provided by the application server 106, a service request message 118 may be transmitted to the S-CSCF 104. The incoming request message is filtered in component 115 by applying the downloaded iFCs. The resulting routing decision comprises to forwarded the received message as service request message 120 towards the application server 106. Triggered by the request message 120, the AS 106 may then provide the requested service to the user identity 102.

Whereas it has been discussed with reference to FIG. 1A that iFCs are provided via OAM to the HSS 108, which in turn provides the iFCs to the CSCF 104, in FIG. 1B a different mechanism for providing iFCs is illustrated with network 100'. Like reference numerals designate like elements in the figures. A new service is made available for use by a preparatory action schematically illustrated in FIG. 1B by bent arrow 122. Action 122 may for example comprise to implement a new service on the application server 106'. In alternative embodiments, an already implemented service may be made available, for example, by activating the service. Many other possibilities are apparent to the skilled person.

Triggered by action 122, the application server 106' transmits a message 124 towards the CSCF 104' which includes a service availability information indicating the availability of the service. The message 124 is a SIP REGISTER message which is intended for registering the application server 106 with the new service in the network 100.

Upon reception of message 124, a routing component 105' of the CSCF 104' performs an action 126 to establish a new iFC. Action 126 will be discussed in detail below. The component 105' comprises the component 105 of FIG. 1A and further components, as will also be discussed in more detail with reference to subsequent figures.

The new iFC are applied to incoming messages immediately after their creation, even if the user 102 has registered before action 126. Therefore, the incoming service request message 118 may be filtered according to the new iFC and may be forwarded as message 120 to the application server 106' in the same way as has been discussed already with reference to FIG. 1A. Additionally, the new iFC is provided to the HSS 108' within a message 128 for storage.

Figure 1B:
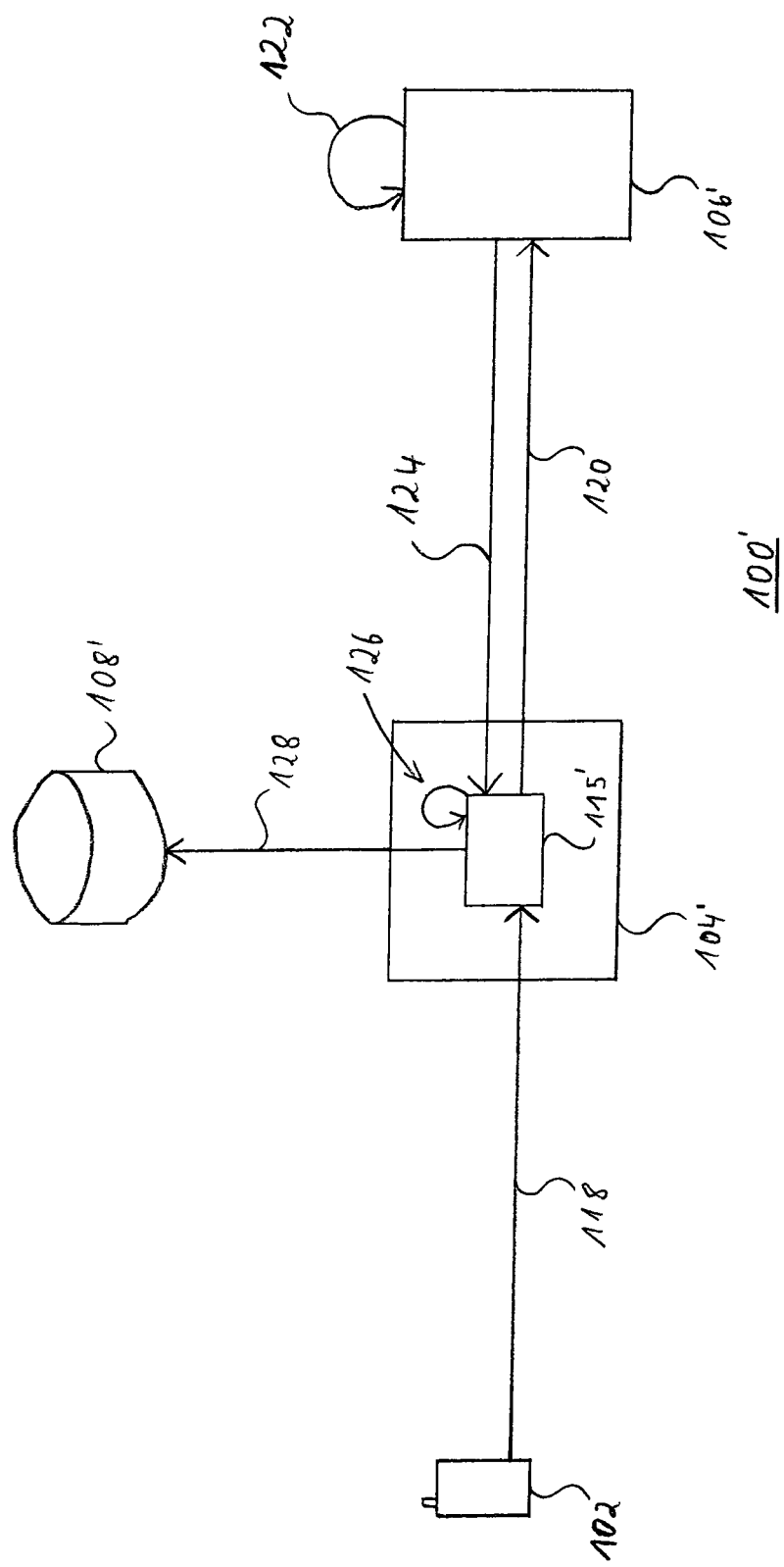
Figure 2:
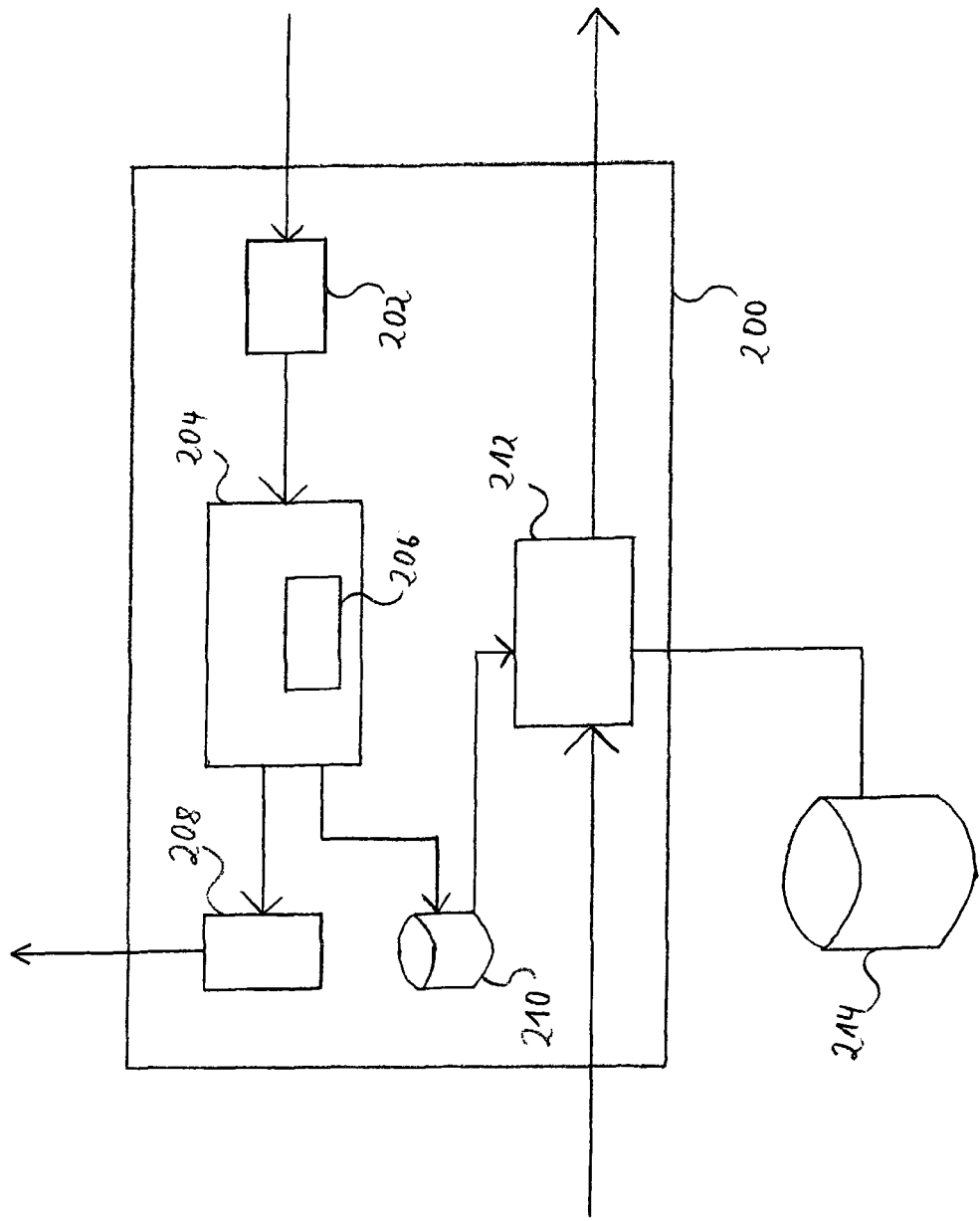
FIG. 2 is a functional block diagram schematically illustrating an embodiment of a service routing node.

FIG. 2 is a functional block diagram illustrating in more detail components of a service routing node 200, which may be an implementation of the node 104' in FIG. 1B.

The service routing node 200 comprises a reception component 202, which is adapted to receive from a service hosting node such as the application server 106' in FIG. 1B service availability information indicating an availability of a service in the service hosting node. The node 200 further comprises a rule establishing component 204, which is adapted to establish a service routing rule based on the received service availability information. An extraction component 206 is associated with the rule establishing component 204. The extraction component 206 is adapted to extract data from the service availability information for generating the service routing rule. The established rules may be stored in an internal service routing rule database 210. For example, the rule establishing component 204 may create a new rule and store this rule in the database 210. The service routing rules stored in database 210 may have a flag associated with them, which indicates if the rules are active or not. Establishing a rule in response to an incoming service availability information or a service unavailability information may mean to change the corresponding flag in the database 210 from a set status to an unset status or vice versa.

A transmission component 208 of node 200 is adapted to transmit the newly established service routing rule to a service routing rule database in the service provisioning network, for example to a service profile database such as the HSS 108' in FIG. 1B. The routing node 200 further comprises a routing component 212 which is adapted for routing incoming service-related messages, e.g. service requests from a user identity registered in the network. The routing comprises to apply service routing rules, such as iFCs in an IMS network, and to forward service-related messages according to a matching service routing rule to the service control node indicated therein. The routing component 212 applies all rules stored in the internal service routing rule database 210 marked as active rules.

The service routing rules stored in database 210 may include variables (placeholders). For example, a rule may include a variable instead of an URI or URL for the service hosting node to forward a message to. Variables have to be replaced at "runtime", i.e. at the time a message has been found to match the filter criteria of the rule. For replacement, the routing component 212 of node 200 is adapted for accessing external databases such as the database 214, which may or may not be located in the service provisioning network. As an example, the database 214 may store a table associating a key (acting similarly to a pointer), which is provided in the service routing rule, with a currently valid URL for the service control node. The key is provided in the rule in conjunction with the variable and is used to lookup the URL, which then replaces the variable.

Figure 3:
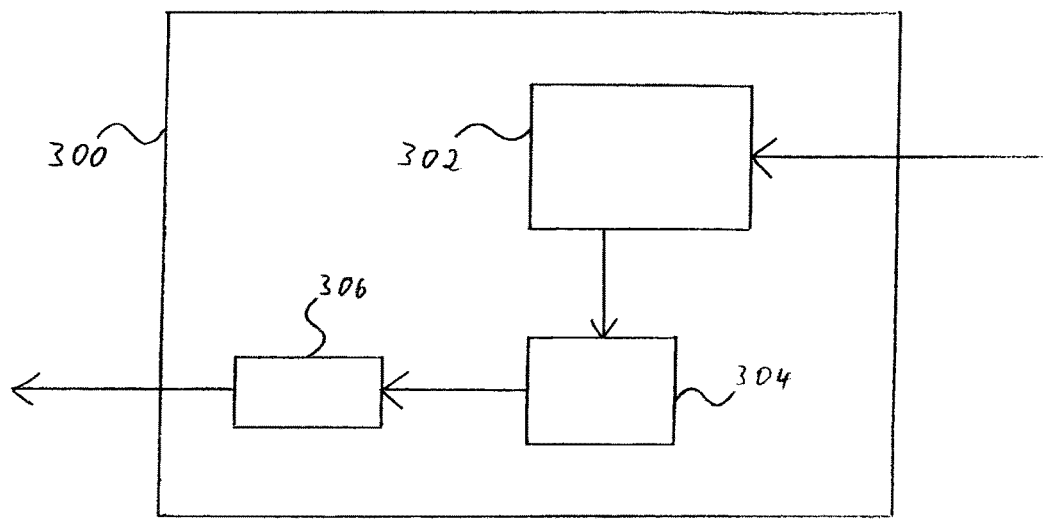
FIG. 3 is a functional block diagram schematically illustrating an embodiment of a service hosting node.

FIG. 3 is a functional block diagram schematically illustrating components of an embodiment of a service hosting node 300 for providing services in a service provisioning network. The service hosting node 300 may be an implementation of the node 106' in FIG. 1B. For example, the node 300 may be an application server.

The node 300 comprises a service preparation component 302, which is adapted to prepare an availability of a service. For example, the component 302 may instantiate one or more service objects, which are then ready for providing the service to a requesting user identity. Additionally or alternatively, the component 302 may control the download of data from server internal or external databases (not shown), the download and implementation of program code, the initiation of network connections to external service components, etc. The component 302 may also prepare the availability of a service for a future use only, for example, the service may be available from the next day on or may be available in one hour from the current time for one day. The component may also simply activate an already implemented service, e.g., in response to a manual input of network operator or service provider personnel.

The service hosting node 300 further comprises an availability indication component 304, which is adapted to create service availability information indicating the availability of the service. The component 304 may be triggered internally by the preparation component 302 or may additionally or alternatively be triggered by external signals, for example by manual input. The component 304 may, as an example, prepare a registration message (e.g., a SIP register message) as an indication of service availability. The component 304 may also, for example, generate a service reference information and include these in the registration message.

The service availability information are provided to a transmission component 306 of node 300, which may, for example, determine a network address of one or more service routing nodes in a service provisioning networks and initiates transmission of the message including the service availability information to these nodes. For example, the component 306 may provide a message to a network interface of the node 300 (not shown) for transmission.

Figure 4:
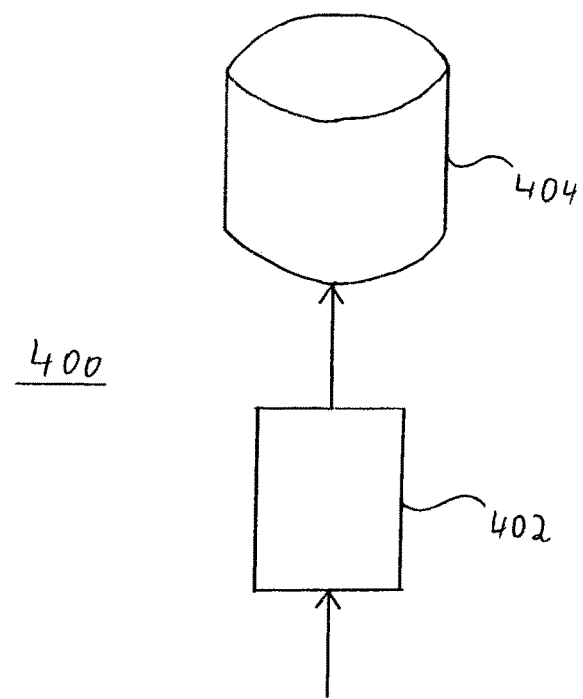
FIG. 4 is a functional block diagram schematically illustrating an embodiment of a service routing rule database.

FIG. 4 schematically illustrates functional components of an embodiment of a service routing rule database 400, which may be an implementation of the database 108 illustrated in FIGS. 1A and 1B.

The database 400 comprises a reception component 402, which is adapted to receive a service routing rule from a service routing node, wherein the service routing rule has been generated or otherwise established by the service routing node. For example, the component 402 may be adapted to receive iFCs from one or more CSCF nodes in an IMS network. The database 400 further comprises a storage component 404, which is adapted to store the received service routing rules.

The service routing rule database 400 may serve as a storage for a pool of service routing nodes. The database 400 may be a part of a service profile database for storing service profiles associated with user identities. For example, the storage component 404 may be a part of an HSS in an IMS network, wherein iFCs are stored in association with user service profiles.

Figure 5:
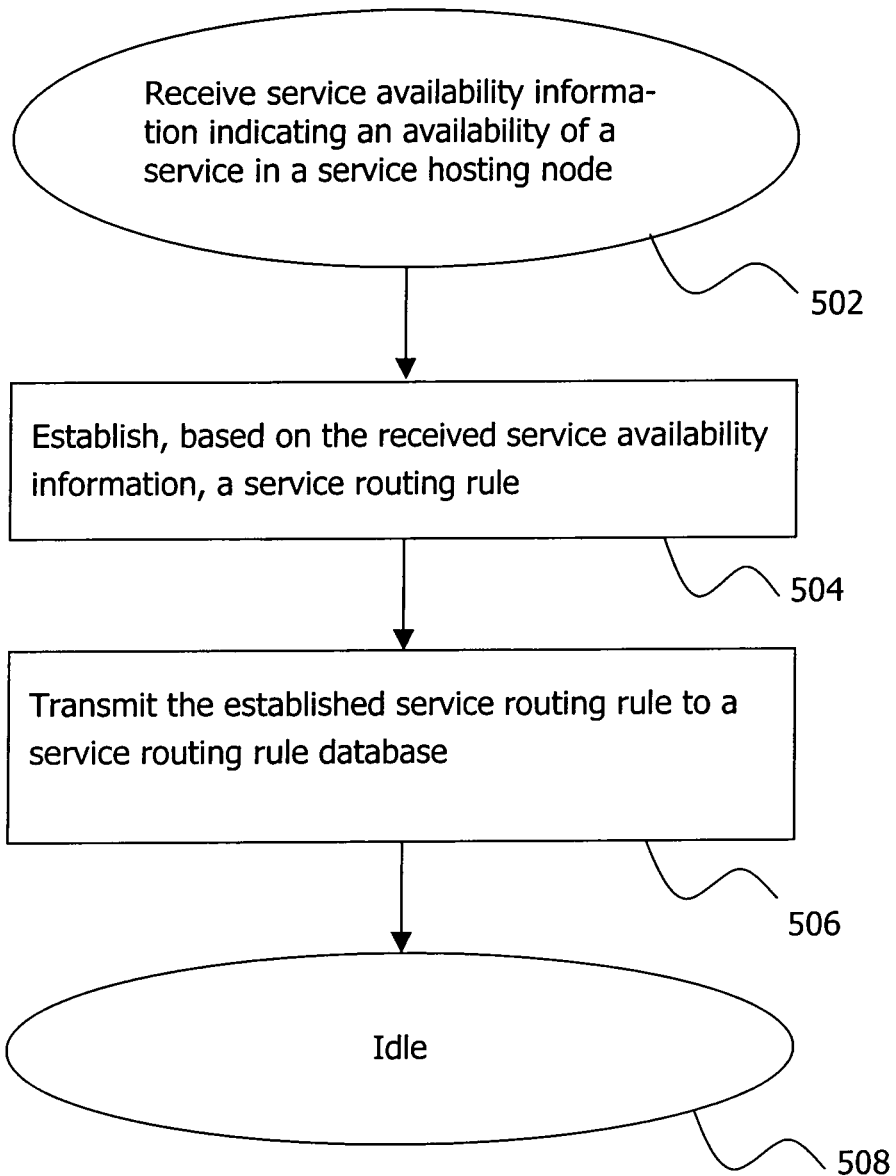
FIG. 5 is a flow chart schematically illustrating steps of a first embodiment of a method for providing services in a service provisioning network.

FIG. 5 is a flowchart illustrating steps of a first embodiment of a method for providing a service in a service provisioning network performed in a service routing node, for example the node 104' of FIG. 1B or node 200 in FIG. 2. In the service provisioning network, a service-related message is routed by the service routing node according to one or more service routing rules to a service hosting node hosting the service. The method starts in step 502 by the reception of service availability information indicating an availability of the service in the service hosting node. The service availability information may originate from the service hosting node or another entity, e.g. an administration terminal or another service control node.

In step 504, based on the service availability information, a service routing rule is established. For example, a new service routing rule may be created or an existing service routing rule may be activated for being applied for filtering incoming service-related messages. In step 506, the established service routing rule is transmitted to a service routing rule database, for example to a service profile database in the service provisioning network for storing service profiles related to user identities (e.g., an HSS in an IMS network). The method ends in step 508 with the service routing node being idle and, for example, waiting for incoming service-related messages to apply the established service routing rule to.

Figure 6:
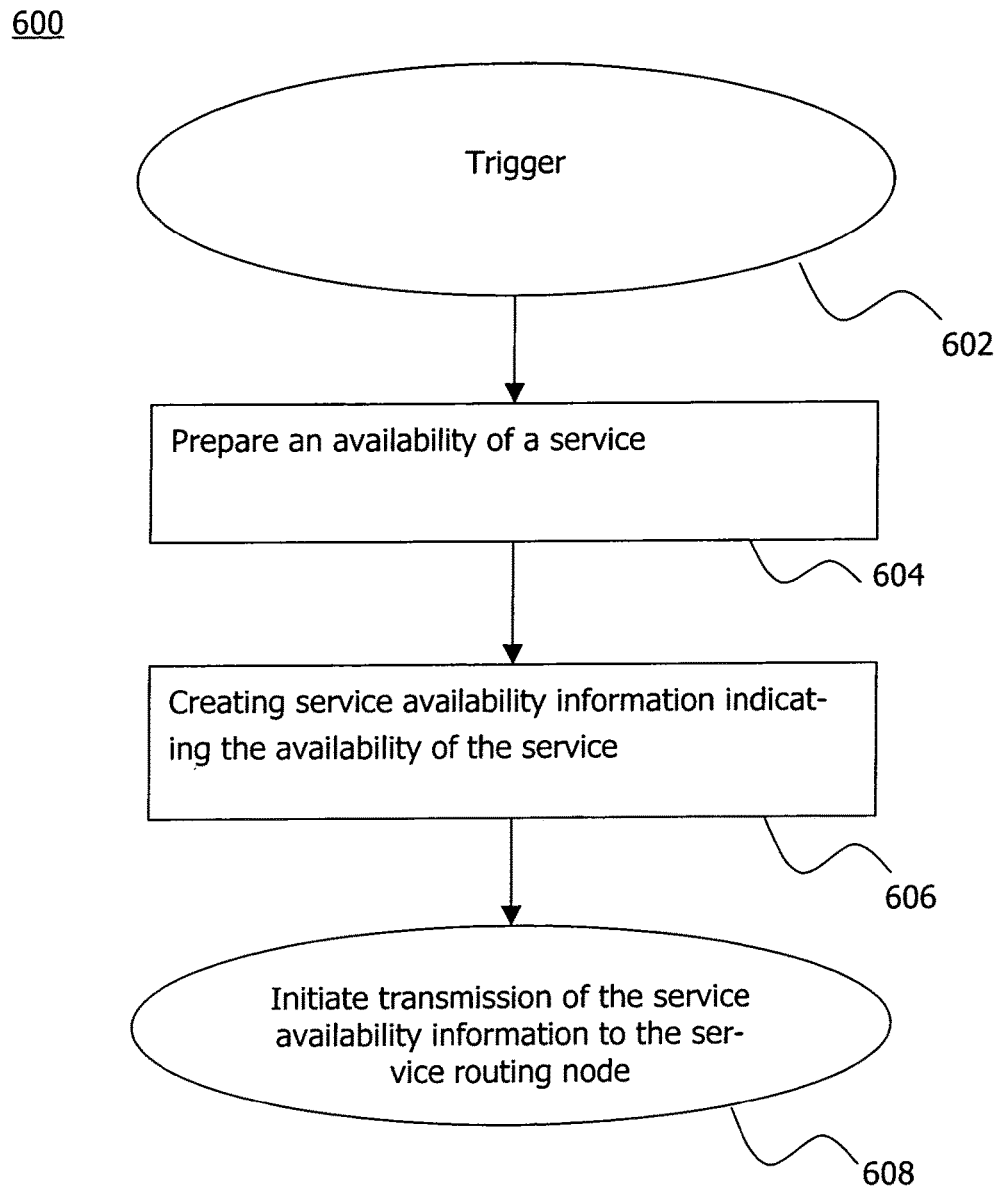
FIG. 6 is a flow chart schematically illustrating steps of a second embodiment of a method for providing services in a service provisioning network.

FIG. 6 schematically illustrates steps of a second method embodiment for providing a service in a service provisioning network. The method is performed in a service hosting node, for example the node 106' in FIG. 1B or node 300 in FIG. 3. In the service-provisioning network, a service-related message is routed according to service routing rules by a service routing node to a service hosting node hosting the service.

The method starts in step 602 with a trigger signal, which may for example be a manually entered administration command. In step 604, an availability of the service is prepared. In step 606, service availability information is created which indicates the availability of the service. The method ends in step 608 by initiating a transmission of the service availability information to the service routing node. The transmission may be performed by the service hosting node itself or another node, e.g. a service control node associated with the service hosting node.

Figure 7:
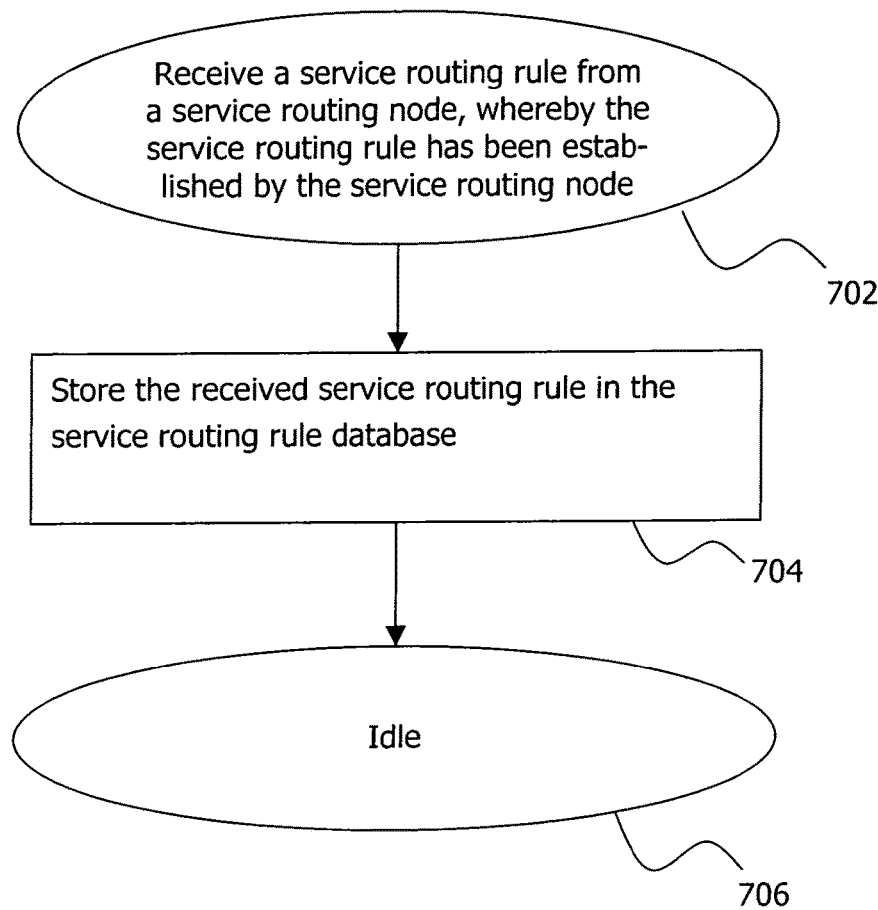
FIG. 7 is a flow chart schematically illustrating steps of a third embodiment of a method for providing services in a service provisioning network.

FIG. 7 schematically illustrates steps of a third method embodiment for providing services in a service provisioning network. A service-related message is routed by a service routing node to a service hosting node hosting the service according to one or more service routing rules provided to the service routing node by a service routing rule database. The steps of the method are performed in the service routing rule database.

The method starts in step 702 with the reception of a service routing rule from a service routing node, whereby the service routing rule has been established by the service routing node. In step 704, the received service routing rule is stored in the service routing rule database. In step 706, the method ends.

Figure 8:
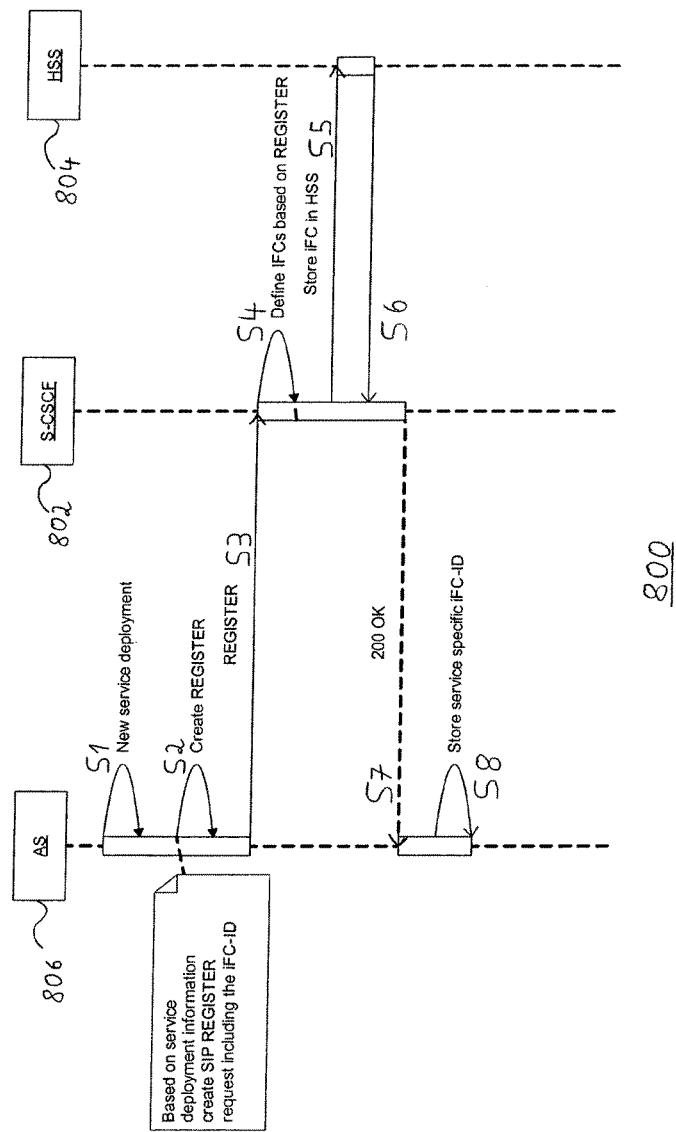
FIG. 8 is a sequence chart schematically illustrating an embodiment of a message sequence in a service provisioning network.

FIG. 8 schematically illustrates an embodiment of a message sequence 800 in a service provisioning network comprising an S-CSCF 802, an HSS 804 and an application server 806. The S-CSCF 802 may be an implementation of the service routing node 104' in FIG. 1B or of the node 200 in FIG. 2. The HSS 804 may be an implementation of the service routing rule database 108' in FIG. 1B or of the database 400 in FIG. 4. The application server 806 may be an implementation of the service hosting node 106' in FIG. 1B or of the node 300 in FIG. 3.

In step S1, a new service is deployed on the application server 806. For example, the service may be implemented on the server 806. After the deployment procedure is finished, the new service is available for use. Based on the service deployment information, in step S2 the application server 806 creates service availability information indicating the availability of the service. To this end, the server 806 creates a SIP REGISTER message (in this embodiment).

FIG. 9 illustrates an example of a REGISTER message which may be created by the application server 806. In FIG. 9, the message is illustrated as comprising lines 1-12 for purposes of reference. The general content and format of a SIP REGISTER message is known to the skilled person, see for example the IETF (Internet Engineering Task Force) RFC (Request for Comment) 3261.

In step S2 in FIG. 8, the application server 806 further creates an iFC-ID as a reference number for referencing the newly deployed service. For passing the iFC-ID, a special parameter may be defined in the REGISTER message. In the example message shown in FIG. 9, the "ifcid" parameter is defined for this purpose, which may be included in the Contact header field, see line 11 of FIG. 9. The iFC-ID may uniquely identify the service at least for the services available at the application server 806. In other embodiments, the iFC-ID may be unique within the service provisioning network. The iFC-ID may be generated by the S-CSCF. The procedure of generating an iFC-ID may also be performed in a distributed way. For example, the application server may generate a first part of the ID, which is unique for the services hosted by the server. The ID may then be transmitted to the S-CSCF, which adds a further part to the ID, for example a fixed number specific to the S-CSCF or a unique number for the services routed by the S-CSCF or a combination of this.

In step S3 in FIG. 8, the application server 806 transmits the SIP REGISTER message to the S-CSCF 802. In step S4, the S-CSCF 802 creates a new iFC based on the received service availability information. The occurrence of the ifcid parameter in the Contact header field is interpreted by the S-CSCF 802 as service availability information which triggers the generation of a new iFC in case no existing iFC with the received iFC-ID is found in an iFC database associated with the CSCF 802. A REGISTER message not containing an iFC-ID may not be interpreted as including service availability information; thus no iFC establishment procedure is triggered in the CSCF. In alternative embodiments, an iFC establishment procedure may be based on further or other triggers.

FIG. 10 illustrates an iFC that may be generated based on the REGISTER message of FIG. 9. For constructing the iFC 1000, the received message including the service availability information is analysed and information is extracted from the message. For example, an URI or URL of the target application server (the address to which to route incoming service-related messages) is derived from the value of the address parameter in the Contact header of the received message. Referring to the examples of FIGS. 9 and 10, the Contact address given in line 8 of the REGISTER message is extracted from the message 900 and is included in the iFC 1000 in FIG. 10 as the routing address in the lines referenced by numeral 1002.

Various service point triggers (SPTs) for the iFC may also be derived from the received message. Examples are outlined in the following based on further analysis of the Contact header field in the received REGISTER message 900 (lines 8-11). The filter criterion "type of incoming service-related message" is defined based on extracting the value of the parameter "methods" in line 11 of the REGISTER message 900. The method or message type "INVITE" is extracted and included in the newly generated iFC 1000 as defining an SPT in lines 1004.

As a further filter criterion, the session type (session case) of an incoming service-related message is defined in lines 1006 in iFC 1000. This SPT is not extracted from the REGISTER message 900 of FIG. 9. Instead, a general operator's policy is assumed that all automatically generated iFCs shall trigger on the 'originating session' case. Therefore, an SPT such as that in lines 1006 is introduced without analysing the triggering service availability information in this respect. In alternative embodiments, a session case SPT could also be defined by extracting some information from an incoming service availability information.

A further SPT is defined in lines 1008 of iFC 1000, specifying that the "To"-header in an incoming service-related message has to match a particular URI. For constructing the SPT 1008, the "From"-header field is extracted from the REGISTER message 900 (line 2). Still further, in lines 1010 an SPT is defined relating to a type or types of a requested service in a service-related message. The service types 'audio' and 'video' are extracted from the Contact header of the REGISTER message in FIG. 9 (lines 8 and 9). These features have to be specified in an Accept-Contact header of an incoming service-related message to match the SPT 1010. In case a service-related message matches to all the SPTs defined in the iFC 1000 in FIG. 10, the message is forwarded to the application server defined in lines 1002.

Further or other SPTs may also be defined according to operator preferences which may or may not be based on extracting information from the received service availability information. For example, data from databases internal or external to the service provisioning network may be used to generate iFCs.

In case an iFC such as iFC 1000 of FIG. 10 does already exist, e.g. is stored in an inactivated status in a service routing rule database, the reception of the REGISTER message 900 of FIG. 9 may trigger an activation of the existing iFC. The activation may be based on the transmitted iFC-ID. For example, the service routing node may analyse the received iFC-ID by attempting to access an iFC corresponding to the iFC-ID in a database.

In step S5 of FIG. 8, the S-CSCF 802 stores the new iFC in the HSS 804. In step S6, the HSS confirms storage of the iFC. In step S7, the S-CSCF 802 confirms registration to the application server 806. Upon reception of the confirmation message, in step S8, the AS 806 stores the iFC-ID for future reference. For example, a service request forwarded from a user device via the S-CSCF 802 to the application server 806 may include the iFC-ID.

FIG. 11 is an example of a service-related message, to which the iFC 1000 of FIG. 10 may be applied when arriving at the S-CSCF 802. The SIP INVITE message 1100 of FIG. 11 may originate, e.g., from the user device 102 in FIG. 1B, i.e. message 1100 may be a representation of the message 118 in FIG. 1B. The message 1100 matches all the SPTs defined in the iFC 1000: The message is an INVITE message (SPT 1004); the session has been initiated by the sending user device (SPT 1006); the To header matches with the To header given in the iFC (SPT 1008); and the requested service features in the Accept-Contact header field matches with the content types specified in iFC 1000 (SPT 1010). As a result, the S-CSCF 802 in FIG. 8 forwards the INVITE message 1100 to the application server 1002 defined in the iFC 1000.

It has been described with reference to FIG. 1B and FIG. 8 that newly created or otherwise established iFCs may be uploaded to a service routing rule database in the service provisioning network, for example to an HSS associated with the S-CSCF in an IMS network. Newly generated or otherwise established iFCs may be applied to incoming service-related messages as soon as they have been established in the service routing node, independent from a storage process in a service routing rule database. For example, the iFC 1000 of FIG. 10 may immediately be applied to message routing after its creation. Short-lived rules may in this way be created but never stored in an external database such as service profile database (e.g., an HSS). If a service routing rule is to be stored in a service profile database or in another entity may be discriminated according to a predetermined threshold value. For example, in case it is determined that a rule is to be applied only a time shorter than a threshold time (e.g., one hour), the rule is not stored externally.

Further, newly established iFCs may immediately impact routing decisions, independent of a registration of a user. In other words, the automatic establishing of rules in the service routing node may influence a routing not only for users which register after the establishment of new iFCs, but also for already registered subscribers. In an alternative embodiment, newly established iFCs may be applied to routing in a service routing node only after a registration (re-registration) of a user identity.

FIG. 12 illustrates a further embodiment of a message 1200 including service availability information. The message 1200 differs from message 900 in FIG. 9 in the occurrence of the "Expires" field in line 12. The value of this field indicates in this embodiment a time point "0" seconds from the current time. This may be interpreted by the service routing node as a request for immediately deactivating or removing the iFC indicated by the iFC-ID in line 11. The time may be measured, for example according to the usual SIP procedures, from the reception of the message 1200 in the service routing node. It is up to the operator, whether a message such as that of FIG. 12 may lead only to the deactivation of an iFC, to the removal of the iFC in a memory of the service routing node, or to the removal in a service profile database.

The iFC indicated by the iFC-ID in line 11 of message 1200 may have been previously defined either automatically or by administrative operation. The message 1200 may or may not have been sent by the application server hosting the indicated service. For example, in case a plurality of services is hosted by a server farm, a particular server may be configured to generally control availability of services, such that de-establishment messages such as message 1200 in FIG. 12 may originate from a node different from the service hosting node.

FIG. 13 is a still further embodiment of a message 1300 representing service availability information. In contrast to message 1200 of FIG. 12, the Expires header field in message 1300 indicates a time span of one hour. The message 1300 may be interpreted in a service routing node firstly as a request for immediately creating or activating an iFC indicated by the iFC-ID (in case no iFC with this iFC-ID is currently established). Secondly, the message 1300 requests to de-establish the indicated iFC one hour after reception of the message 1300.

Depending on implementation details, a further message such as message 900 of FIG. 9 sent before the expiry time given in line 12 of message 1300 may lead to the unlimited activation of the indicated iFC. A service availability information comprising an indication such as the Expires header field with a value different from 0, which arrives after the de-activation of an iFC, may lead to its re-activation for the indicated time span.

FIG. 14 illustrates a second embodiment of an iFC 1400, which differs from the iFC 1000 in FIG. 10 in several aspects. An SPT 1402 is defined as a function by specifying the tag <function> with sub-tags <name> and <arg>, wherein the tag <name> defines a type of an operator (i.e. a matching operation performed by the function) which is applied to the arguments <arg>. Therefore, in case the iFC 1400 is applied to an incoming message, the function 1402 analyses if a string "audio" (Argument 2) occurs in an Accept-Contact header field (Argument 1). (Automatically created) iFCs may include one or more functions such as function 1402 which define general string-related operations on the content of a service-related message.

A single iFC such as iFC 1400 may be used for a large number of users. In particular, any INVITE message sent from a user device in an originating session which requests an 'audio' service matches to iFC 1400. In this way, a single iFC (which may or may not be automatically generated) may replace a large number of subscriber-specific iFCs. Functions such as function 1402 may be also be used to define triggering conditions based on, for example, other sources of information such as time, environment variable, databases. Further, triggering condition may also be defined based on an analysis of a message body. For example, the body of a SIP/SDP payload may be analysed.

In lines 1404 in iFC 1400 of FIG. 14, a tag <variable> with sub-tags <table>, <column> and <key> is used to derive the application server name from a database. The database containing the table "Attached_Services_Gateways" may be located internal or external to the service control node or even the service provisioning network. The table is searched using as a key value the content of a "To"-header field in the incoming service-related message. The resulting URI is derived from the column "Gateway_URI". The structure 1404 generally illustrates the usage of variables for accessing information at the time of application of iFCs.

Whereas it has been described in the embodiments hereinbefore that routing decisions based on service routing rules are performed in central routing nodes such as an S-CSCF in IMS networks, the techniques of providing automatically created or otherwise established service routing rules may well be performed in other nodes or at other locations in an IMS network or in any service provisioning network. For example, in a server farm comprising several application servers, one or more servers may include a routing component, for example for the purpose of load balancing. In such a component, which performs routing decisions similar to that which have been discussed above, the techniques proposed herein may also be implemented.

Generally, any nodes involved in performing routing decisions in a service provisioning network with a separation between session/call control and service control may be subject to the techniques described herein.

The techniques proposed herein allow to automatically create or activate service routing rules such as iFCs in IMS networks. For example, instead of providing service routing rules to a service routing rule database such as an HSS and downloading the rules to the service routing node for example upon registration of a user identity, the service routing rules corresponding to a newly available service may be established directly at the service routing node performing the routing decisions. This allows the dynamic deployment of services in a service provisioning network, whereby manual operations or other administrative actions can be minimized.

Further, the techniques allow to apply service routing rules independent of a registration of a user. Therefore, newly created rules may be applied immediately after their creation, facilitating the deployment of new services, for example automatically created services. Still further, in particular for short-lived services, the network traffic can be reduced, as an upload of the established service routing rules to a service routing rule database and subsequent download to a service routing node can be avoided.

A more flexible definition of filter criteria as well as target addresses in iFCs allows to reduce the number of iFCs required and also facilitates the dynamic deployment of services. This allows to generate not only subscriber specific service routing rules, but also rules which may apply to a plurality of subscribers. A smaller number of iFCs need to be supported, for example, in the service routing node. Generally, efficiency is enhanced in the generation, execution and maintenance of service routing rules.

These and other aspects of the proposed techniques are important, for example, in cases where new services are made available on short time scales and/or for a large number of subscribers. For example, subscribers may become subscribed to a new service automatically, without any operator manual action and even without re-registration.

While the current invention has been described in relation to its preferred embodiments, it is to be understood, that this description is intended for illustrative, nonlimiting purposes only. The invention shall be limited only by the scope of the claims appended hereto.

The invention claimed is:

1. A method for providing a service in an IMS network, wherein a service related message is routed by a CSCF according to one or more initial Filter Criteria (iFCs) to an application server hosting the service, the method comprising the following steps in the CSCF:
receiving service availability information indicating an availability of a service in an application server; and
triggering an automatic establishment of an iFC, the iFC being established at least partially based on the service availability information.

2. The method according to claim 1, further comprising the step of transmitting an established iFC to an HSS.

3. The method according to claim 2, wherein the iFC is transmitted to a service profile database for storing service profiles related to user identities.

4. The method according to claim 1, wherein the automatic establishment of the iFC comprises at least one of creating a new iFC and activating an existing iFC.

5. The method according to claim 1, wherein the step of receiving the service availability information comprises receiving a registration request for registering the service.

6. The method according to claim 5, wherein the registration request relates to a new service or to an existing service.

7. The method according to claim 1, wherein an iFC is generated based on data extracted from the service availability.

8. The method according to claim 7, wherein service reference information (ifcid) for referencing the service in a service related message is extracted from the service availability information.

9. The method according to claim 8, wherein the automatic establishment of the iFC is performed in response to a detection of the service reference information in the service availability information.

10. The method according to claim 1, wherein the automatic establishment of the iFC comprises generating service reference information for referencing the service in a service-related message.

11. The method according to claim 1, wherein a plurality of iFCs is established based on the received service availability information.

12. The method according to claim 1, wherein the iFC is related to one or more services provided for one or more user identities.

13. The method according to claim 1, further comprising the steps of:

receiving service unavailability information indicating an unavailability of the service; and
de-establishing, based on the service unavailability information, the iFC.

14. The method according to claim 13, further comprising the step of transmitting, in response to the service unavailability information, a removal or deactivation command to a HSS.

15. The method according to claim 13, wherein the service availability information comprises at least one indication of a point in time, and the iFC is established or de-established according to the time indication.

16. The method according to claim 13, wherein the service availability information comprises the service unavailability information.

17. The method according to claim 2, wherein the established iFC is utilized, independently from a registration of the user identity, by the CSCF for routing service requests.

18. The method according to claim 1, wherein an iFC comprises at least one of instructions for an analysis of a body of the service-related message and instructions for accessing external data during employment of the rule.

19. A method for providing a service in an IMS network, wherein a service related message is routed by a CSCF according to one or more initial Filter Criteria (iFCs) to an application server hosting the service, the method comprising, in the application server, the following steps:
preparing an availability of a service; and
initiating a transmission of service availability information indicating the availability of the service to the CSCF triggering an automatic establishment of an iFC based on the service availability information.

20. The method according to claim 19, further comprising the further step of creating the service availability information.

21. The method according to claim 20, wherein the step of creating the service availability information comprises generating a registration request for registering the service.

22. The method according to claim 19, wherein the service availability information comprises service reference information (ifcid) for referencing the service.

23. The method according to claim 19, comprising the steps of creating and transmitting service unavailability information indicating an unavailability of the service.

24. The method according to claim 23, wherein the service availability information comprises the service unavailability information.

25. The method according to claim 24, wherein the iFC comprises service reference information (ifcid) for referencing a service.

26. A method for providing a service in an IMS network, wherein a service-related message is routed by a CSCF to an application server hosting the service according to one or more initial Filter Criteria (iFCs) provided to the CSCF by an HSS, the method comprising the steps, in the HSS, of
receiving and storing an iFC that is triggered and automatically established by the CSCF, the iFC being established at least partially based on service availability information indicating an availability of a service in the application server.

27. The method according to claim 26, wherein the HSS is included in a service profile database for storing service profiles related to user identities.

28. The method according to claim 26, further comprising the steps of receiving a deactivation command related to the iFC from the CSCF; and deactivating the iFC, responsive to the deactivation command.

29. A CSCF (Call State Control Function) node for providing a service in an IMS network wherein the CSCF is arranged to route a service-related message according to one or more initial Filter Criteria (iFCs) to an application server hosting the service, the CSCF comprising a microprocessor coupled with a memory storing instructions that when executed by the microprocessor causes the CSCF to:

receive service availability information indicating an availability of a service in an application server; and trigger an automatic establishment of an iFC based on the received service availability information.

30. The CSCF according to claim 29, further comprising a transmission component arranged to transmit the iFC to an HSS.

31. The CSCF according to claim 29 further comprising a transmission component arranged to transmit the iFC to an HSS.

32. An application server for providing a service in an IMS network, wherein a service-related message is routed by a CSCF according to one or more initial Filter Criteria (iFCs), to the application server hosting the service, the application server comprising a microprocessor coupled with a memory storing instructions that when executed by the microprocessor cause the application server to:

prepare an availability of the service; and initiate a transmission of service availability information indicating the availability of the service to the CSCF for establishing an iFC based on the service availability information.

33. An HSS for providing a service in an IMS network, wherein a service related message is routed by a CSCF to an application server hosting the service according to one or more initial Filter Criteria (iFCs) and the HSS is arranged to provide the one or more iFCs to the CSCF, the HSS comprising a microprocessor coupled with a memory storing instructions that when executed by the microprocessor cause the HSS to:

receive an iFC received from the CSCF and established by the CSCF, the iFC being established at least partially based on service availability information indicating an availability of a service in the application server; and store the received iFC.

34. The HSS according to claim 33, wherein the HSS is included in a service profile database in the IMS network for storing service profiles related to user identities.

\* \* \* \* \*